(12) United States Patent
Abbaszadeh et al.

(10) Patent No.: US 12,238,137 B2
(45) Date of Patent: Feb. 25, 2025

(54) SYSTEMS AND METHODS FOR POWER SYSTEM SWITCHING ELEMENT ANOMALY DETECTION

(71) Applicant: General Electric Technology GmbH, Baden (CH)

(72) Inventors: Masoud Abbaszadeh, Clifton Park, NY (US); Mitalkumar Kanabar, Markham (CA); Subhrajit Roychowdhury, Niskayuna, NY (US); Pubudu Eroshan Weerathunga, Markham (CA); Balakrishna Pamulaparthy, Hyderabad (IN)

(73) Assignee: GE INFRASTRUCTURE TECHNOLOGY LLC, Greenville, SC (US)

(*) Notice: Subject to any disclaimer, the term of this patent is extended or adjusted under 35 U.S.C. 154(b) by 359 days.

(21) Appl. No.: 17/696,164

(22) Filed: Mar. 16, 2022

(65) Prior Publication Data
US 2023/0300170 A1  Sep. 21, 2023

(51) Int. Cl.
*H04L 41/16* (2022.01)
*G06F 21/75* (2013.01)
*H04L 9/40* (2022.01)

(52) U.S. Cl.
CPC ........ *H04L 63/1466* (2013.01); *G06F 21/755* (2017.08); *H04L 41/16* (2013.01); *H04L 63/20* (2013.01)

(58) Field of Classification Search
CPC ..... H04L 63/1466; H04L 41/16; H04L 63/20; H04L 63/1425; G06F 21/755; H02J 3/0012; H02J 13/00002
See application file for complete search history.

(56) References Cited

U.S. PATENT DOCUMENTS

| | | | |
|---|---|---|---|
| 8,892,903 B1 * | 11/2014 | Trimberger | G06F 21/755 |
| | | | 713/189 |
| 9,405,900 B2 | 8/2016 | Dixit et al. | |

(Continued)

OTHER PUBLICATIONS

International Search Report and Written Opinion for PCT/US2023/015384, dated Jun. 27, 2023, 8 pages.

*Primary Examiner* — Amie C. Lin
(74) *Attorney, Agent, or Firm* — Eversheds Sutherland (US) LLP

(57) ABSTRACT

Systems and methods for power system switching element (PSSE) anomaly detection are disclosed. An example PSSE anomaly detection unit may include a power system switching element position estimator (PSSEPE) and a comparison unit. The PSSEPE may be configured to receive a set of measurements and a set of control commands associated with a PSSE, calculate an anomaly confidence score based on the set of measurements and the set of control commands, and estimate a calculated PSSE position based on the set of measurements and the set of control commands. The comparison unit may be configured to receive the calculated PSSE position from the PSSEPE, receive the set of measurements and the set of control commands from the PSSEPE, receive a reported PSSE position associated with the PSSE, and determine a PSSE anomaly decision based on a difference between the reported PSSE position and the calculated PSSE position.

20 Claims, 10 Drawing Sheets

(56) References Cited

U.S. PATENT DOCUMENTS

| | | |
|---|---|---|
| 10,819,719 B2 | 10/2020 | Garry |
| 11,093,311 B2 * | 8/2021 | Chagam Reddy .... G06F 15/161 |
| 2014/0266669 A1 | 9/2014 | Fadell et al. |
| 2017/0117841 A1 | 4/2017 | Watanabe et al. |
| 2017/0168115 A1 * | 6/2017 | Lung ........................ H02H 7/26 |
| 2019/0115175 A1 * | 4/2019 | Saito ....................... H02J 9/061 |
| 2020/0284826 A1 | 9/2020 | Savarda et al. |
| 2021/0014196 A1 * | 1/2021 | Schweitzer, III ....... G06F 21/70 |
| 2021/0066141 A1 | 3/2021 | Phan et al. |
| 2021/0117770 A1 | 4/2021 | He et al. |
| 2021/0148996 A1 * | 5/2021 | Paul ....................... G01R 31/56 |
| 2021/0185081 A1 | 6/2021 | Cardenas Medina et al. |

* cited by examiner

900 ↘

902
Receiving, via a power system switching element position estimator, a set of measurements and a set of control commands associated with the power system switching element 904
Receiving a reported power system switching element position associated with the power system switching element 906
Calculating, via the power system switching element position estimator, an anomaly confidence score based at least in part on the set of measurements and the set of control commands 908
Estimating, via the power system switching element position estimator, a calculated power system switching element position based at least in part on the set of measurements and the set of control commands 910
Determining a power system switching element anomaly decision based at least in part on a difference between the reported power system switching element position and the calculated power system switching element position

FIG. 9

SYSTEMS AND METHODS FOR POWER SYSTEM SWITCHING ELEMENT ANOMALY DETECTION

FIELD OF DISCLOSURE

The present disclosure is related to power system switching elements, and more particularly to systems and methods for power system switching element anomaly detection.

BACKGROUND

Systems and methods for detecting anomalies in power system switching elements may involve a pre-installation process before becoming operational and may have significant risks of generating false positive results. An in-situ solution for detecting anomalies in power system switching elements from the time of installation that has a reduced false positive rate may thus be critical.

BRIEF DESCRIPTION OF THE DRAWINGS

The detailed description is set forth with reference to the accompanying drawings. The drawings are provided for purposes of illustration only and merely depict exemplary embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

FIG. 9 is an example process flow diagram of an illustrative method, in accordance with one or more example embodiments of the disclosure.

DETAILED DESCRIPTION

Overview

Figure 1:
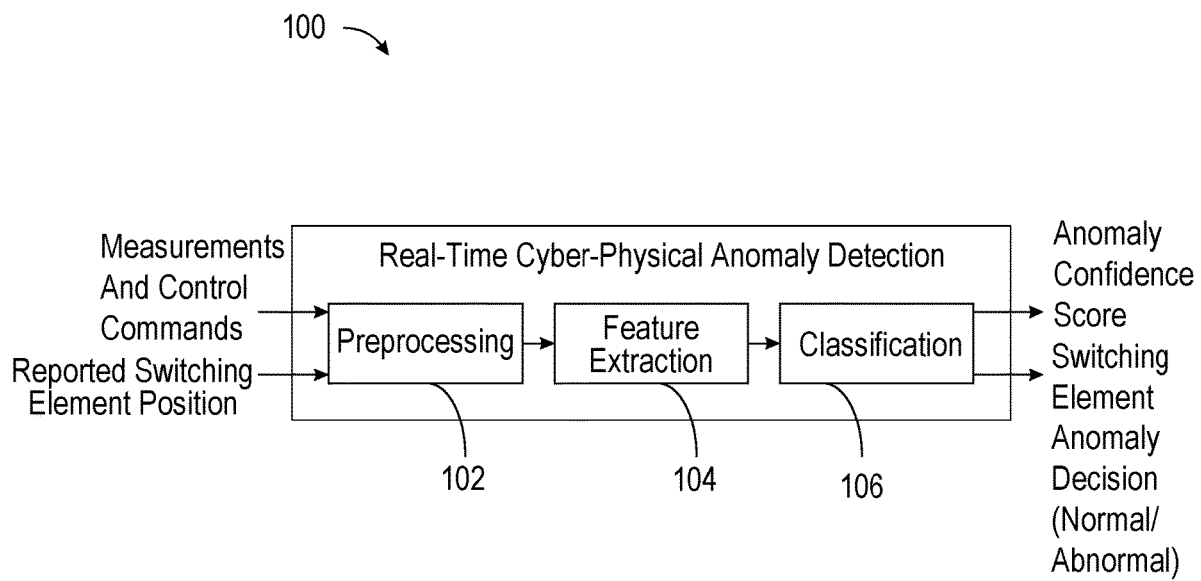
FIG. 1 depicts an example real-time cyber-physical anomaly detection system, in accordance with one or more example embodiments of the disclosure.

This disclosure relates to, among other things, systems and methods for power system switching element (PSSE) anomaly detection. An example PSSE anomaly detection unit may include a power system switching element position estimator (PSSEPE) and a comparison unit. The PSSEPE may be configured to receive a set of measurements and a set of control commands associated with a PSSE, calculate an anomaly confidence score based on the set of measurements and the set of control commands, and estimate a calculated PSSE position based on the set of measurements and the set of control commands. The PSSE may be a circuit breaker, a switch, a position indicator, an isolator, a recloser, or another power system switching element. The comparison unit may be configured to receive the calculated PSSE position from the PSSEPE, receive the set of measurements and the set of control commands from the PSSEPE, receive a reported PSSE position associated with the PSSE, and determine a PSSE anomaly decision based on a difference between the reported PSSE position and the calculated PSSE position.

In one or more embodiments, the systems and methods for power system switching element anomaly detection described herein may improve upon conventional methods for detecting anomalies in power system switching elements. By using an automated and intelligent detection process to detect anomalies, real-time detection of anomalies and isolation of power system switching elements may be performed rapidly. This automated and intelligent detection process may additionally mitigate the possibility of false positives. This technical solution thus allows for a robust system and method to detect anomalies in power system switching elements.

In one or more embodiments, a power system switching element anomaly detection unit may include a power system switching element position estimator and a comparison unit. In one or more embodiments, the power system switching element position estimator may be configured to receive a set of measurements and a set of control commands associated with a power system switching element, calculate an anomaly confidence score based at least in part on the set of measurements and the set of control commands, and estimate a calculated power system switching element position based at least in part on the set of measurements and the set of control commands. In one or more embodiments, the comparison unit may be configured to receive the calculated power system switching element position from the power system switching element position estimator, receive the set of measurements and the set of control commands from the power system switching element position estimator, receive a reported power system switching element position associated with the power system switching element, and determine a power system switching element anomaly decision based at least in part on a difference between the reported power system switching element position and the calculated power system switching element position.

In one or more embodiments, the anomaly confidence score may be scaled from 0 to 1.

In one or more embodiments, the power system switching element position estimator may be trained using a machine learning algorithm, a first generated dataset associated with normal operations of the power system switching element, and a second generated dataset associated with abnormal operations of the power system switching element.

In one or more embodiments, the power system switching element position estimator is trained using a historical dataset associated with the power system switching element.

In one or more embodiments, the power system switching element anomaly detection unit is configured to upload data associated with the power system switching element anomaly detection unit to an online server.

In one or more embodiments, the set of measurements can include one or more measured values associated with the power system switching element, where the one or more measured values can include a voltage measurement and/or a current measurement for each phase of three phases associated with the power system switching element, a temperature associated with the power system switching element, an arcing current or energy associated with the power system switching element, and/or light sensor data associated with the power system switching element.

In one or more embodiments, the power system switching element anomaly detection unit may further include a status intrusion detection unit that is configured to determine that a control operation associated with the power system switching element has occurred, determine that no maintenance associated with the power system switching element is scheduled, and transmit a malicious control sequence alert. In one or more embodiments, the power system switching element anomaly detection unit may be further configured to receive a status intrusion flag and a flag confidence score from the status intrusion detection unit.

In one or more embodiments, a method for detecting an anomaly in a power system switching element may be disclosed herein. In one or more embodiments, the method may include receiving a set of measurements and a set of control commands associated with the power system switching element via a power system switching element position estimator. In one or more embodiments, the method may further include receiving a reported power system switching element position associated with the power system switching element. In one or more embodiments, the method may additionally include calculating an anomaly confidence score based at least in part on the set of measurements and the set of control commands. In one or more embodiments, the method may further include estimating a calculated power system switching element position based at least in part on the set of measurements and the set of control commands. In one or more embodiments, the method may additionally include determining a power system switching element anomaly decision based at least in part on a difference between the reported power system switching element position and the calculated power system switching element position.

FIG. 1 depicts an example real-time cyber-physical anomaly detection system 100, in accordance with one or more example embodiments of the disclosure.

In some embodiments, a set of measurements and a set of control commands associated with a power system switching element may be received at a preprocessing unit 102 of the real-time cyber-physical anomaly detection system 100. The power system switching element may be a circuit breaker, a switch, a position indicator, an isolator, a recloser, or another power system switching element. The set of measurements may include voltage and current measurements associated with the power system switching element. A reported position of the power system switching element may also be received at the preprocessing unit 102. The set of measurements, the set of control commands, and the reported position of the power system switching element may undergo feature extraction at a feature extraction unit 104 of the real-time cyber-physical anomaly detection system 100. Subsequently, the extracted features, the set of measurements, the set of control commands, and the reported position of the power system switching element may undergo classification at a classification unit 106 of the real-time cyber-physical anomaly detection system 100. The classification unit 106 may be configured to output an anomaly confidence score and a power system switching element anomaly decision, where the power system switching element anomaly decision may be either normal or abnormal.

Figure 2:
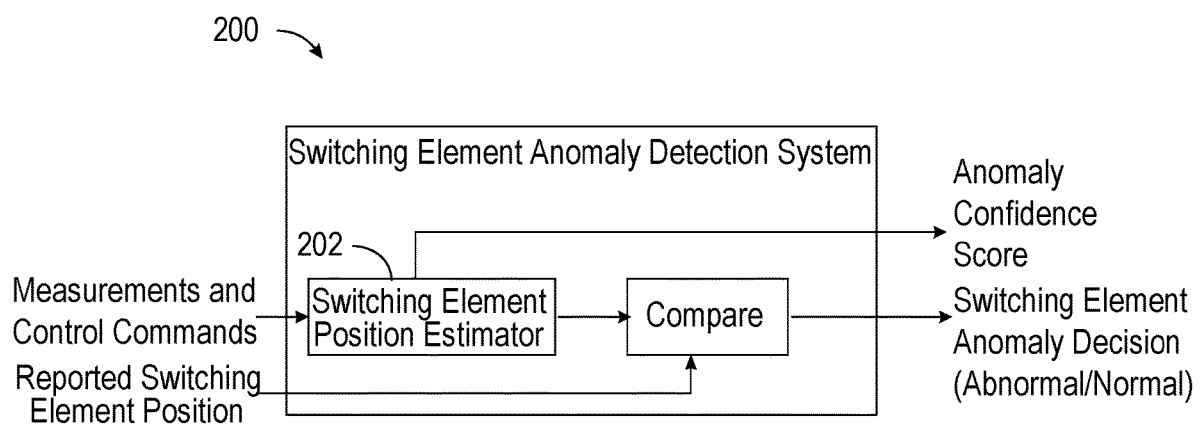
FIG. 2 depicts an example power system switching element anomaly detection system, in accordance with one or more example embodiments of the disclosure.

FIG. 2 depicts an example power system switching element anomaly detection system 200, in accordance with one or more example embodiments of the disclosure.

In some embodiments, the power system switching element anomaly detection system 200 may be configured to receive a set of measurements and a set of control commands at a power system switching element position estimator 202 of the power system switching element anomaly detection system 200. The set of measurements may include voltage and current measurements associated with the power system switching element. Other measurements may include a temperature associated with the power system switching element, an arcing current or energy associated with the power system switching element, and/or light sensor data associated with the power system switching element. The power system switching element position estimator 202 may determine an estimated power system switching element position based at least in part on the set of measurements and the set of control commands. The power system switching element anomaly detection system 200 may be further configured to receive a reported power system switching element position. The power system switching element anomaly detection system 200 may then compare the reported power system switching element position to the estimated power system switching element position. The power system switching element anomaly detection system may then determine a power system switching element anomaly decision based on the comparison between the reported power system switching element position and the estimated power system switching element position. The power system switching element position estimator 202 may be additionally to calculate an anomaly confidence score.

In some embodiments, the status of the power system switching element may be attacked, but the set of measurements may not be attacked. In such an embodiment, the status may be tricked by an attacker, thus causing the compromised status reported by the power system switching element to not be consistent with the set of measurements, which may indicate that the power system switching element is working properly. In such an instance, the power system switching element may trigger an alert to report the mismatch between the power system switching element's reported status and the power system switching element's actual status.

In some embodiments, the set of voltage and current measurements may be attacked, but the reported set of voltage and current measurements may not be reflective of the actual voltage and current measurements at the power system switching element. In such an embodiment, although the power system switching element may be reported to be compromised, the power system switching element may not be compromised. In such an instance, the power system switching element may trigger an alert to report the mismatch between the power system switching element's status and the set of voltage and current measurements.

In some embodiments, the power system switching element anomaly detection system 200 may not be independently capable of distinguishing whether the power system switching element status has been compromised or whether the set of measurements has been compromised. In some instances, the power system switching element anomaly detection system 200 may be configured to receive an input from a network intrusion detection system regarding status communications of the power system switching element. The power system switching element may be capable of communicating its position through a human machine interface (for example, a remote terminal unit). The network intrusion detection system may then monitor the communication channel from the power system switching element and provide a status intrusion flag and/or a confidence score associated with the status intrusion flag. For example, if the network intrusion detection system is artificial-intelligence-based, the confidence score may be provided in real time for each sampling period. If the confidence score is not available in real time, the confidence score may be pre-set to a constant predetermined value based on performed specifications associated with the network intrusion detection system. In some embodiments, confidence scores may be scaled from 0 to 1 in order to represent the probability of communication intrusions. In some embodiments, the power system switching element anomaly detection system 200 may be configured to share information with the network intrusion detection system in a machine learning feature extraction stage, such as in the feature extraction unit 104 depicted in FIG. 1 (that is, the latent input space to the classification unit, such as the classification unit 106 depicted in FIG. 1), or the anomaly decision stage.

In some embodiments, the power system switching element anomaly detection system 200 may be configured to be trained offline as a binary classifier to provide a prediction of an open/close status of the power system switching element and to determine if an anomaly has occurred. The power system switching element anomaly detection system 200 may be further deployed with adaptive features, such as automatic hyper-parameter optimization, when operating in real time. As depicted in FIG. 2, the position estimator of the power system switching element (for example, the power system switching element position estimator 202 of FIG. 2) may be configured to receive the set of three-phase voltage and current measurements associated with the power system switching element. The position estimator may receive the set of voltage and current measurements in the root mean square (RMS) or phasor formats. In one example, the set of measurements may include the RMS values of the three voltage and the three currents in the power line provided by voltage and current transformers for each phase. Thus, the position estimator may receive seven inputs—six RMS measurement values and one reported power system switching element position. In some embodiments, the seven inputs may be received in time-series measurements at predetermined sample rates. To determine if an attack has occurred, an estimated power system switching element position may be determined based on the six RMS measurement values and then compared with the reported power system switching element position. The position estimator may be further configured to provide a confidence score of its estimated power system switching element position estimator. The confidence score may be scaled from 0 to 1.

Figure 3:
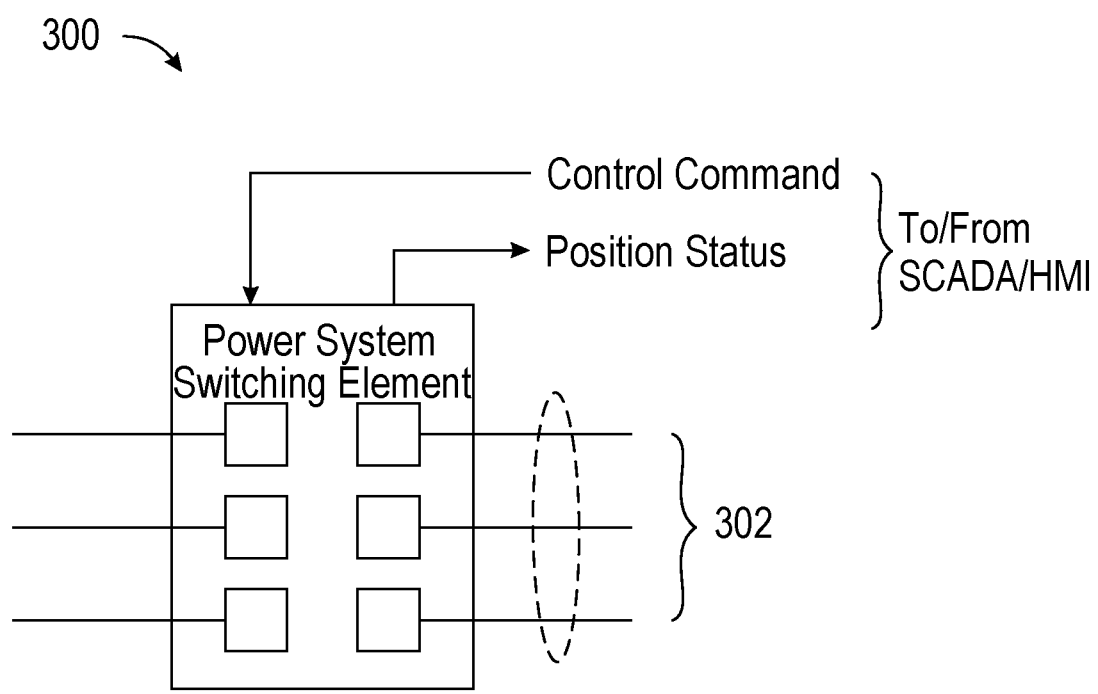
FIG. 3 depicts an example power system switching element, in accordance with one or more example embodiments of the disclosure.

FIG. 3 depicts an example power system switching element 300, in accordance with one or more example embodiments of the disclosure.

In some embodiments, the power system switching element 300 may be configured to be connected to a three-phase power line 302. Voltage and current measurements may be measured for each phase of the three phases. The power system switching element 300 may be further configured to receive a set of control commands from a human machine interface and to transmit a position status of the power system switching element 300 to the human machine interface.

Figure 4:
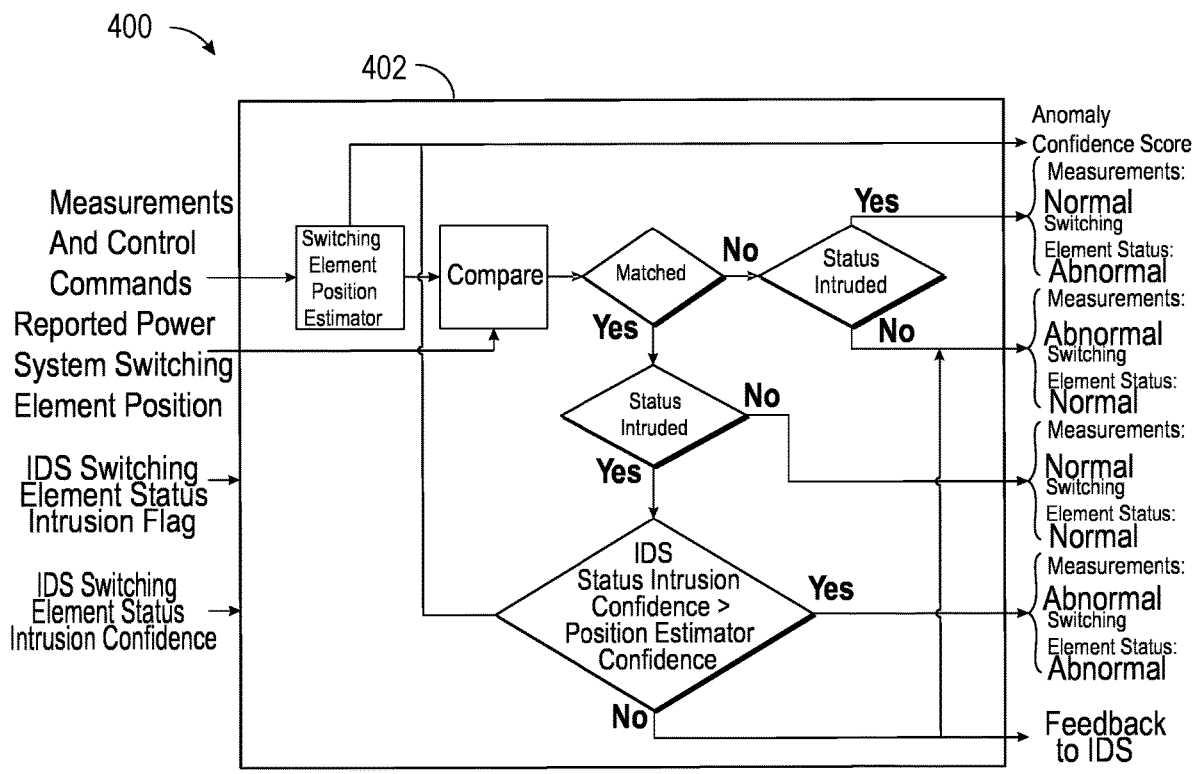
FIG. 4 depicts an example power system switching element anomaly detection system, in accordance with one or more example embodiments of the disclosure.

FIG. 4 depicts an example power system switching element anomaly detection system 400, in accordance with one or more example embodiments of the disclosure.

In some embodiments, the power system switching element anomaly detection system 400 may be configured to detect a status of a power system switching element and/or attacks on the power system switching element. As depicted in FIG. 4, a set of measurements and a set of control commands may be received at a power system switching element position estimator 402 of the power system switching element anomaly detection system 400. An estimated power system switching element position may be calculated based on the set of measurements. The estimated power system switching element may be based at least in part on voltage and current measurements associated with the power system switching element. The power system switching element anomaly detection system 400 may further receive a reported power system switching element position. The power system switching element anomaly detection system 400 may be configured to compare the reported power system switching element position and the estimated power system switching element position. Anomalies in the voltage and current measurements associated with the power system switching element and the estimated power system switching element position may trigger a notification to an operator and may be displayed at a human machine interface and flagged until it is cleared by the operator.

In some embodiments, if the reported power system switching element position matches the estimated power system switching element position, the power system switching element anomaly detection system 400 may be configured to determine if a status intrusion has occurred. Status intrusions may be determined by an intrusion detection system's status intrusion flag. If no status intrusion is detected, the set of measurements may be concluded to be normal and the status of the power system switching element may be also concluded to be normal. If a status intrusion is detected, the power system switching element anomaly detection system 400 may be configured to receive an estimated power system switching element position confidence score and to determine a status intrusion confidence score. Subsequently, if the power system switching element status intrusion confidence score is greater than the estimated power system switching element position confidence score, the set of measurements may be concluded to be abnormal and the status of the power system switching element may also be concluded to be abnormal. If the power system switching element status intrusion confidence score is not greater than the estimated power system switching element position confidence score, the set of measurements may be concluded to be abnormal, the status of the power system switching element may be concluded to be normal, and the power system switching element anomaly detection system 400 may be configured to provide feedback of a potential false alarm to an intrusion detection system. In some embodiments, false positives may be eliminated by cross-referencing abnormal sets of measurements and/or abnormal statuses of the power system switching element with known malicious control sequence indicators.

In some embodiments, if the reported power system switching element position does not match the estimated power system switching element position, the power system switching element anomaly detection system 400 may be configured to determine if a status intrusion has occurred. Status intrusions may be determined by an intrusion detection system's status intrusion flag. If a status intrusion is detected, the set of measurements may be concluded to be normal, and the status of the power system switching element may be concluded to be abnormal. If no status intrusion is detected, the set of measurements may be concluded to be abnormal, and the status of the power system switching element may be concluded to be normal. Additionally, in some embodiments, the power system switching element position estimator 402 may be additionally configured to calculate an anomaly confidence score.

In some embodiments, if a set of control commands is detected to open or close a power system switching element, but the set of control commands is not intentional, and the set of control commands is not coming from a predetermined gateway, the power system switching element anomaly detection system 400 may trigger an alert associated with a potential malicious control sequence. Intentional sets of control commands to open or close the power system switching element may involve electrical faults, scheduled maintenance, a manual trip by an operator, or an automatic trip under certain conditions such as load shedding, unstable system operations, storms or other weather-related conditions, auto-reclosure operations, or other applicable conditions. The alert may be transmitted to a maintenance person and/or an operator, who may then acknowledge and clear the alert if no malicious control sequence is identified. In some embodiments, the predetermined gateway may act as a data acquisition device between intelligent electronic devices, may be capable of protocol conversion and transferring information and control commands between intellectual electronic devices and other components, and may be configured to pass control signals to power system switching elements even if a malicious control sequence is detected.

Figure 5:
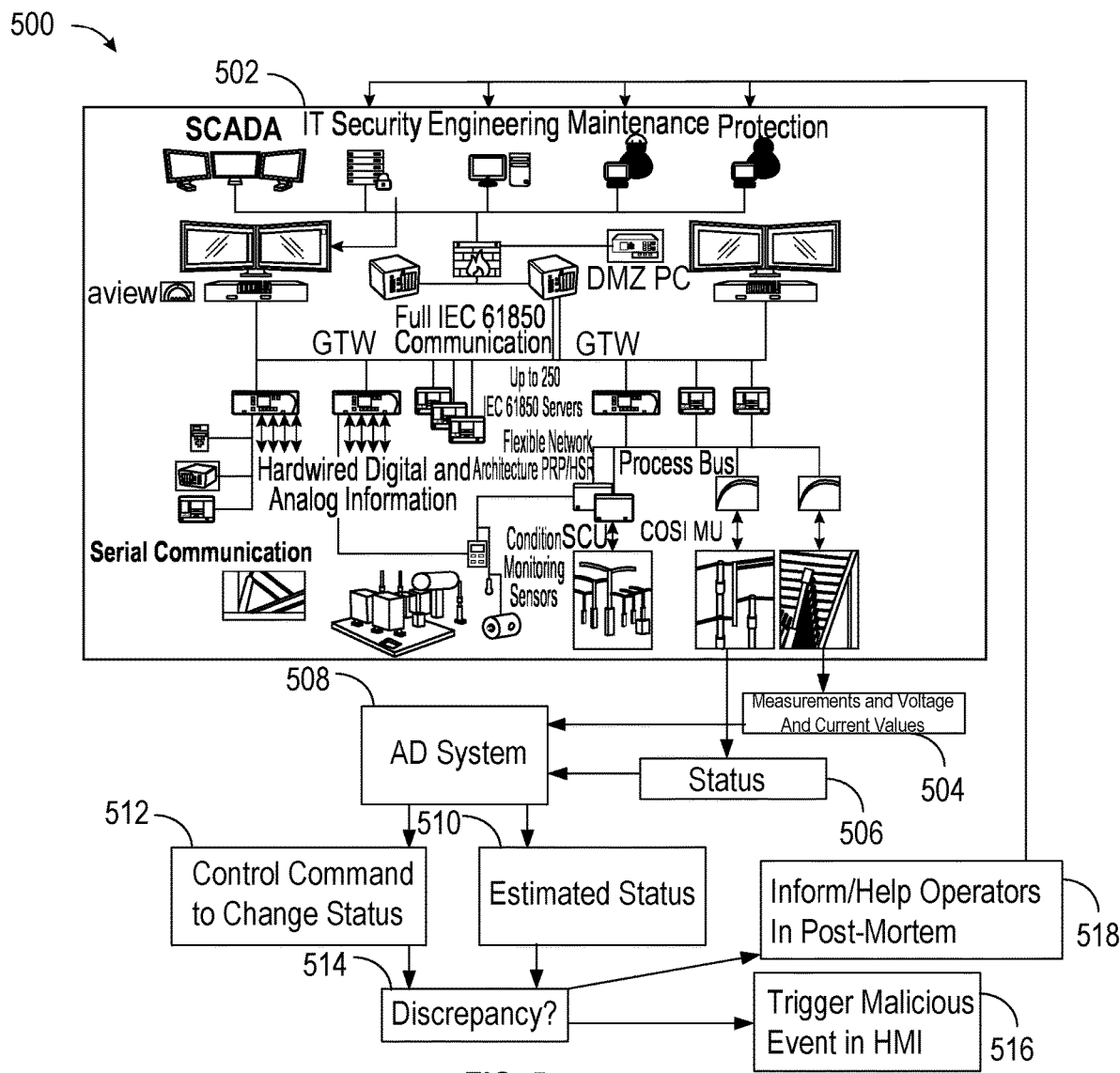
FIG. 5 depicts an example process for detecting a malicious control sequence, in accordance with one or more example embodiments of the disclosure.

FIG. 5 depicts an example process 500 for detecting a malicious control sequence, in accordance with one or more example embodiments of the disclosure.

In one or more embodiments, the process 500 for detecting a malicious control sequence may be implemented in a flexible network architecture 502. The flexible network architecture 502 may include components such as process busses, condition monitoring sensors, and other components as depicted in FIG. 5. In some embodiments, voltage and current values and a set of measurements 504 and a power system switching element status 506 may be received from the flexible network architecture to an advanced design system 508. The advanced design system 508 may provide an estimated power system switching element status 510 and a set of control commands 512 to change or maintain the status of the power system switching element based at least in part on the voltage and current values and the set of measurements 504. Subsequently, a discrepancy 514 between the estimated power system switching element status 510 and the set of control commands 512 may be detected. If the discrepancy 514 is detected, a malicious control sequence detector 516 may be triggered at a human machine interface, and operators may be informed of the malicious control sequence during a post-mortem 518.

In some embodiments, the discrepancy 514 may be identified in several circumstances. For example, the discrepancy 514 may be identified where the voltage and current values 504 are compromised, where a human machine interface is displaying incorrect data pertaining to a health status of the power system switching element or the human machine interface is displaying data that does not match with the estimated power system switching element status 510, and where a forecasted health index identifies a power system switching element as being unhealthy in the future prior to the power system switching element becoming unhealthy.

Figure 6:
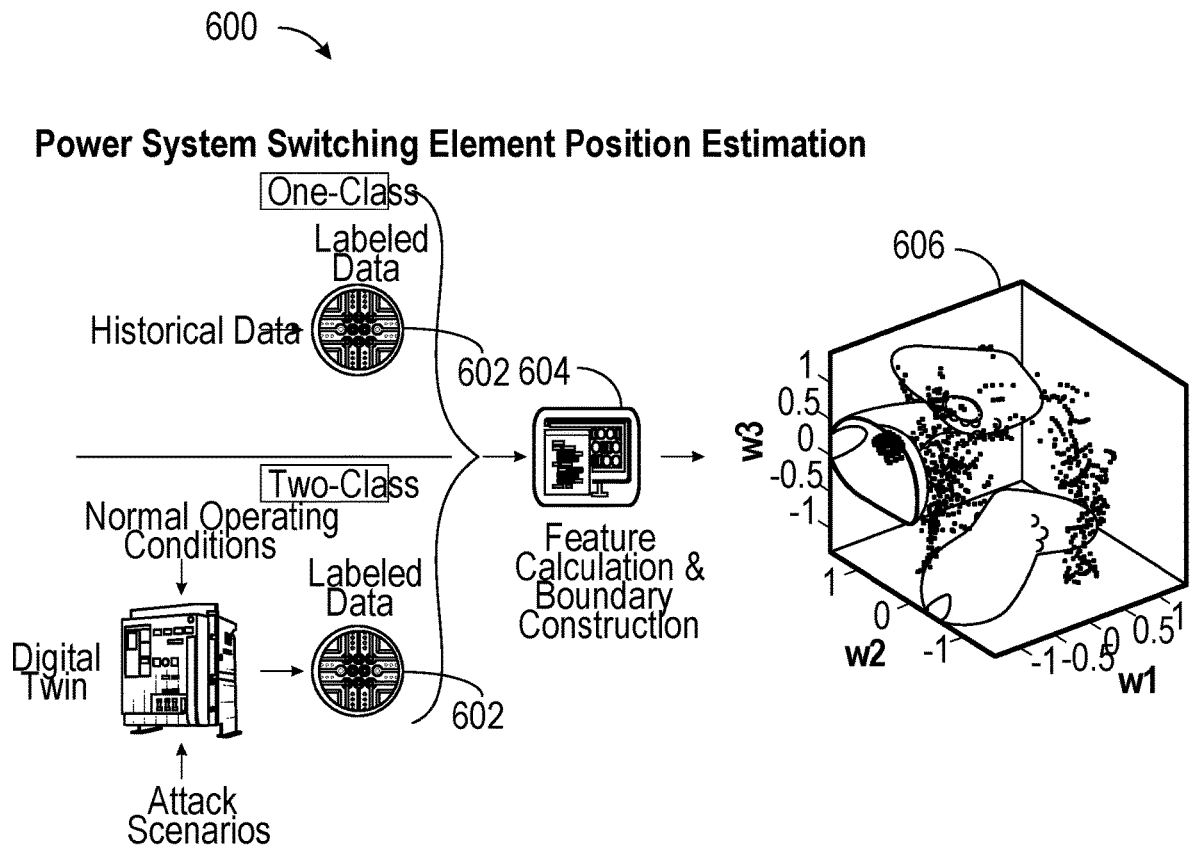
FIG. 6 depicts an example offline training process for a power system switching element position estimator, in accordance with one or more example embodiments of the disclosure.

FIG. 6 depicts an example offline training process 600 for a power system switching element position estimator, in accordance with one or more example embodiments of the disclosure.

In some embodiments, the power system switching element position estimator may be a binary classifier that is configured to receive a set of measurements and a set of control commands and to predict an open/close position of each power system switching element in a system. The binary classifier may be any machine learning or deep learning structure, for example, deep neural networks, extreme learning machines, and support vector machines.

In some embodiments, the binary classifier may be trained using a two-class or a one-class supervised training. The training may be performed using a combination of historical data and/or simulated data as the training dataset. The simulated data may be generated using simulation platforms based on physics-based digital twins or surrogate-model data-driven digital twins. In some embodiments, a two-class supervised training process may be physics-based or data-driven. In a physics-based two-class supervised training process, datasets may be generated for both normal and abnormal spaces. Supervised machine learning then may be undergone, which utilizes simulations of both normal and abnormal operations and attacks. In a data-driven two-class supervised training process, datasets may be generated for abnormal spaces, in conjunction with historical data available in the normal spaces.

In some embodiments, a one-class supervised training process may include classification decision boundaries computed using historical normal field data based on one-class training. In such an embodiment, because the one-class supervised training process relies on historical field data, the one-class supervised training process may not be reliant on simulation data and/or historical abnormal field data. In other embodiments, the one-class supervised training process may involve simulated normal data. In such an embodiment, the training dataset may only include the simulated normal data as the training dataset, or the training dataset may include the simulated normal data and historical normal field data as the training dataset. In such an embodiment, the one-class supervised training process may not be reliant on abnormal data, regardless of whether the abnormal data is historical abnormal field data or simulated abnormal data.

In some embodiments, historical field data may be collected from power system switching element monitoring nodes. The power system switching element monitoring nodes may provide voltage and/or current sensor measurement data for each phase. The power system switching element monitoring nodes may be sensors, actuators, and/or control parameters. Time-series data at each monitoring node may then be used to extract features, such as mathematical characterizations of the time-series data. For example, features may include a maximum, a minimum, a mean, a standard deviation, a variance, a setting time, a Fast Fourier Transform spectral component, a linear principal component, a non-linear principal component, independent components, sparse coding, deep learning, and other features, such as those described in U.S. Publication Nos. 2018/0157831, 2019/0222596, and 2019/0056722.

In some embodiments, the type and number of features for each power system switching element monitoring node may be optimized using hand-crafted domain knowledge, feature engineering, or receiver operating characteristic (ROC) statistics. In some embodiments, features may be computed using statistical or signal-based relations and/or deep learning. In some embodiments, local features for each monitoring node may be stacked to create a global feature vector, which may also contain interactive features involving more than one monitoring nodes, thus demonstrating the correlation between two or more monitoring nodes. In such an embodiment, the raw input data or features may be normalized. For example, the raw input data or the features may be extracted and normalized as described in U.S. Pat. Nos. 10,819,725 and 10,417,415. The dimension of the global feature vector may be further reduced using dimensionality reduction techniques, for example, principal component analysis (PCA). In some embodiments, the features may be calculated over a sliding window of the signal time series, and the length of the window and the duration of the slide may be determined based on domain knowledge, data inspection, and/or batch processing. In embodiments where the features include deep learning features, example deep learning features may include deep autoencoder embeddings and deep layer outputs of any deep neural network, such as long short-term memory networks, multilayer perceptrons, and other deep neural networks. In some embodiments, time-based features may be extracted, and examples of time-based features may include rate-of-change features as a time derivative of each monitoring node or a partial derivative of each monitoring node with respect to another monitoring node.

As depicted in FIG. 6, the offline training process 600 may mathematically represent a classification decision boundary manifold in the feature space, thus separating an open class and a closed class in a 3-D feature space. For example, labeled data 602, which may include historical data if a one-class supervised training process is utilized or normal space data and abnormal space data if a two-class supervised training process is utilized, may be used for feature calculation and boundary construction 604. Normal space data may include the absence of abnormal space data and also naturally occurring fault scenarios. Subsequently, a 3-D feature space 606 showing circumstances in which a power system switching element may be opened or closed may be generated based on the feature calculation and boundary construction 604.

Figure 7:
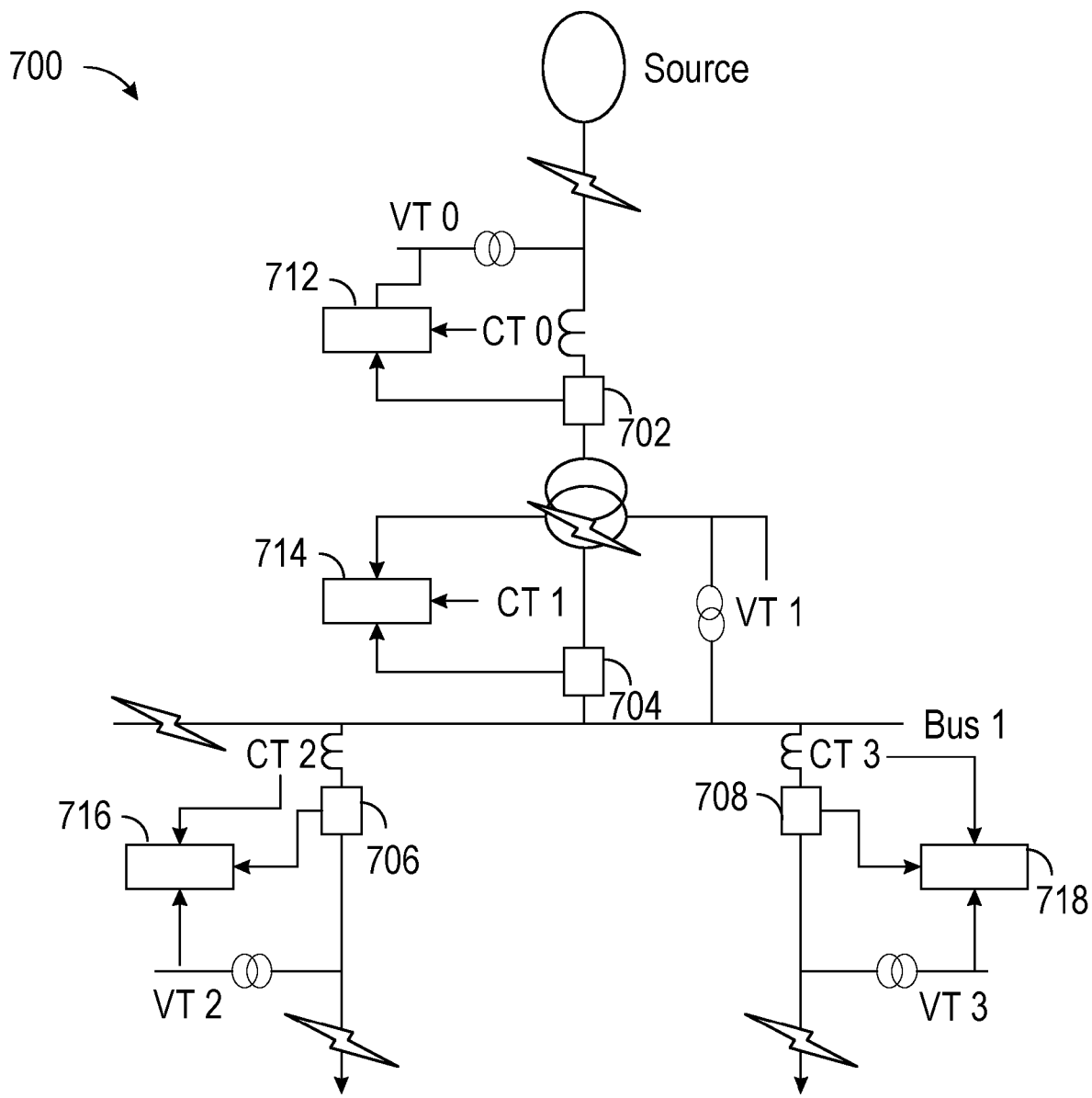
FIG. 7 depicts an example attacked isolation architecture in accordance with one or more example embodiments of the disclosure.

FIG. 7 depicts an example attacked isolation architecture 700 in accordance with one or more example embodiments of the disclosure.

In some embodiments, the attacked isolation architecture 700 may be implemented in a multi-breaker system. For example, as depicted in FIG. 7, the attacked isolation architecture may be implemented in a four-breaker system. The attacked isolation architecture 700 may thus be configured to identify specific breakers that are attacked. Each breaker may be monitored by an individual anomaly detection system that runs simultaneously to the other individual anomaly detection systems. The individual anomaly detection systems may be structured similarly, but may be configured for individualized parameter tuning when using a classifier. In some embodiments, the individual anomaly detection systems may use a binary classifier. In other embodiments, the individual anomaly detection systems may access at least one multi-class classifier model that has at least one decision boundary. In some embodiments, the classifier may indicate whether a monitoring status is normal, attacked, or faulty based at least in part on the classification result. In some embodiments, the classifier may detect specific failure modes of a circuit breaker. For example, systems and methods of detecting specific failure modes of a circuit breaker may include those described in U.S. Pat. No. 10,686,806.

As depicted in FIG. 7, in some embodiments, the attacked isolation architecture 700 may be implemented in a four-circuit-breaker system having a first breaker 702, a second breaker 704, a third breaker 706, and a fourth breaker 708. A first individual anomaly detection system 712 may be configured to monitor the first breaker 702. A second individual anomaly detection system 714 may be configured to monitor the second breaker 704. A third individual anomaly detection system 716 may be configured to monitor the third breaker 706. A fourth individual anomaly detection system 718 may be configured to monitor the fourth breaker 708. As a result of this arrangement, the attacked isolation architecture 700 enables the identification of the breaker(s) of the first breaker 702, the second breaker 704, the third breaker 706, and the fourth breaker 708 that are attacked. In the event that a breaker has been identified as being attacked, the breaker may be automatically isolated in real time by the attacked isolation architecture 700.

It should be noted that the attacked isolation architecture 700 may be implemented in systems having power system switching elements and may not be limited to systems involving breakers.

Figure 8:
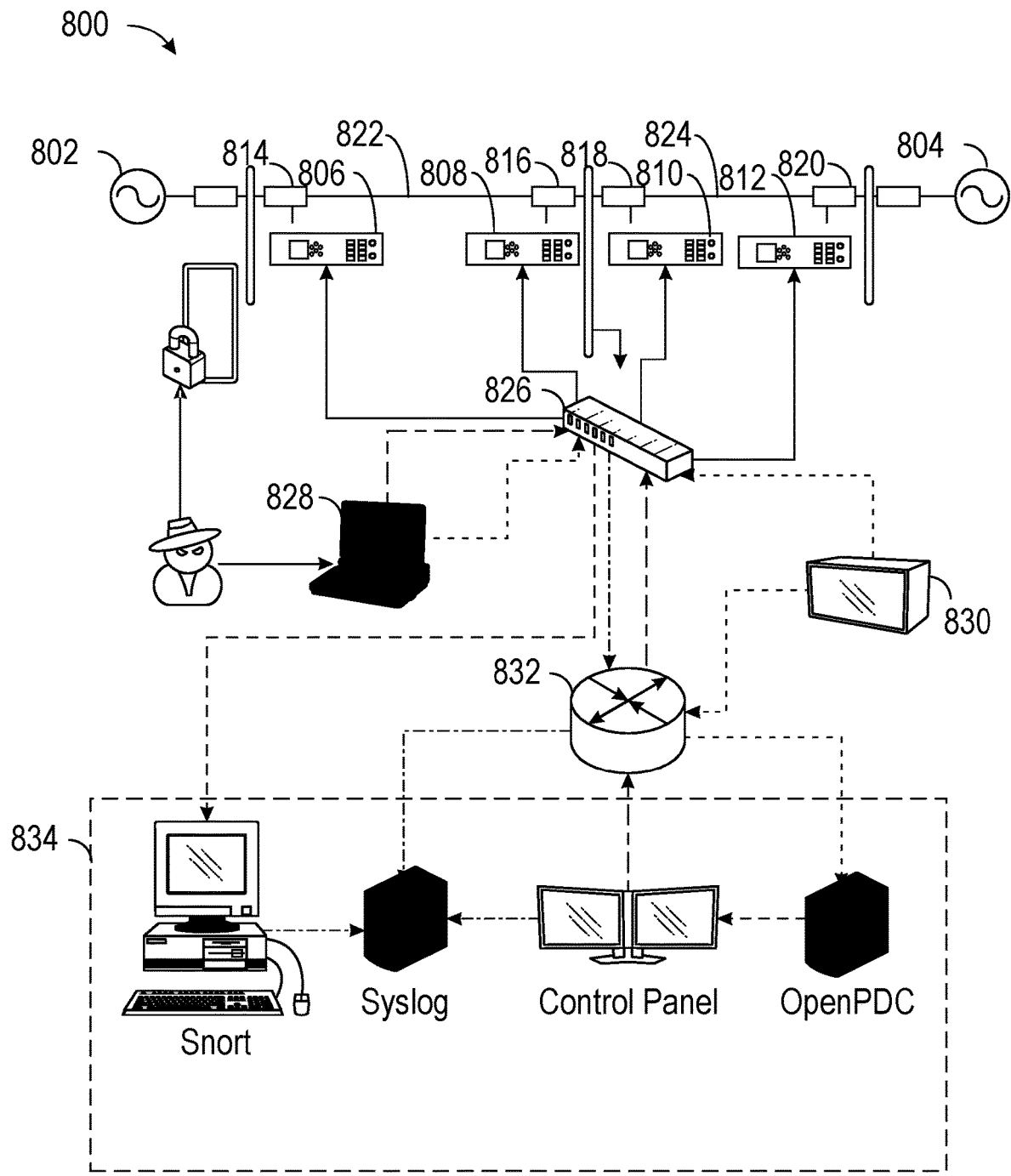
FIG. 8 depicts an example network diagram in accordance with one or more example embodiments of the disclosure.

FIG. 8 depicts an example network diagram 800 in accordance with one or more example embodiments of the disclosure.

In some embodiments, the network diagram 800 may include various components, including a first power generator 802, a second power generator 804, a first intelligent electronic device (IED) 806, a second IED 808, a third IED 810, a fourth IED 812, a first breaker 814, a second breaker 816, a third breaker 818, a fourth breaker 820, a first line 822, and a second line 824. As depicted in FIG. 8, the first line 822 spans from the first breaker 814 to the second breaker 816, and the second line 824 spans from the third breaker 818 and the fourth breaker 820. In some embodiments, the first IED 806 may be configured to automatically control the first breaker 814, the second IED 808 may be configured to automatically control the second breaker 816, the third IED 810 may be configured to automatically control the third breaker 818, and the fourth IED 812 may be configured to automatically control the fourth breaker 820. In some embodiments, each IED may utilize a distance protection scheme that trips a respective breaker when a fault is detected at the respective breaker, regardless of whether the fault detection is valid or false. In some embodiments, each IED may be configured to receive manual commands from an operator to trip a respective breaker. For example, the manual override to trip a respective breaker by an operator may be used when maintenance is being performed on each line or each system component.

In some embodiments, the first breaker 814, the second breaker 816, the third breaker 818, and the fourth breaker 820 may all be configured to be connected to a substation switch 826. The substation switch 826 may be configured to receive manual commands from an operator via a laptop 828 or other means of communication with the substation switch. The substation switch 826 may be further configured to be coupled to a power distribution cabinet (PDC) 830. The substation switch 826 may be additionally configured to be coupled to a router 832 that is connected to a control room 834. The control room 834 may include components such as an open PDC, a control panel, a system log, and a component using Snort.

In some embodiments, a circuit including some or all of the various components, including the first power generator 802, the second power generator 804, the first IED 806, the second IED 808, the third IED 810, the fourth IED 812, the first breaker 814, the second breaker 816, the third breaker 818, the fourth breaker 820, the first line 822, and the second line 824, may additionally include three current sensors and three voltage sensors. Each of the breakers may operate and report its respective position status based on the data generated by the three current sensors and the three voltage sensors. In some embodiments, simulations may be performed to generate data for the three current measurements and the three voltage measurements at varying loads and fault conditions. During such simulations, a breaker status of each breaker may be additionally recorded. In some embodiments, a feedforward deep neural network may be set up as a classifier to predict a breaker status of each breaker based on historical data. In some embodiments, the feedforward deep neural network may be trained using a subset of historical simulation data. Historical simulation data that is not used to train the feedforward deep neural network may be maintained in a database for future testing purposes. The subset of historical simulation data used to train the feedforward deep neural network may be split into data that is used for training and data that is used to validate the model during the training phase.

FIG. 9 is an example process flow diagram of an illustrative method 900. At block 902, the method 900 may include receiving, via a power system switching element position estimator, a set of measurements and a set of control commands associated with the power system switching element. At block 904, the method 900 may include receiving a reported power system switching element position associated with the power system switching element. At block 906, the method 900 may include calculating, via the power system switching element position estimator, an anomaly confidence score based at least in part on the set of measurements and the set of control commands. At block 908, the method 900 may include estimating, via the power system switching element position estimator, a calculated power system switching element position based at least in part on the set of measurements and the set of control commands. At block 910, the method 900 may include determining a power system switching element anomaly decision based at least in part on a difference between the reported power system switching element position and the calculated power system switching element position.

In one or more embodiments, the anomaly confidence score may be scaled from 0 to 1.

In one or more embodiments, the power system switching element position estimator may be trained using a machine-learning algorithm, a first generated dataset associated with normal operations of the power system switching element, and a second generated dataset associated with abnormal operations of the power system switching element.

In one or more embodiments, the power system switching element anomaly detection unit may be configured to upload data associated with the power system switching element anomaly detection unit to an online server.

In one or more embodiments, the set of measurements may include one or more measured values associated with the power system switching element, wherein the one or more measured values includes a voltage measurement and/or a current measurement for each phase of three phases associated with the power system switching element, a temperature associated with the power system switching element, an arcing current or energy associated with the power system switching element, and/or light sensor data associated with the power system switching element.

In one or more embodiments, the power system switching element anomaly detection unit may be further configured to determine that a control operation associated with the power system switching element has occurred, to determine that no maintenance associated with the power system switching element is scheduled, and to transmit a malicious control sequence alert.

In one or more embodiments, the power system switching element anomaly detection unit may be further configured to receive a status intrusion flag and a flag confidence score from an intrusion detection system.

In one or more embodiments, the power system switching element anomaly detection unit may be configured to be updated online based on event-based or time-based events. A continuous learning model updater may be configured to determine an update timeframe associated with the system based on trigger occurrence detection. The update timeframe may be short-term, mid-term, long-term, or another update timeframe. The trigger occurrence detection may be associated with a time-based trigger, a performance-based trigger, an event-based trigger, or another applicable trigger. The continuous learning model may be configured to update an anomaly detection classifier model in accordance with the determined update timeframe and continuous learning.

The operations described and depicted in the illustrative process flow of FIG. 9 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIG. 9 may be performed.

One or more operations of the process flow of FIG. 9 may have been described above as being performed manually or by a user device, or more specifically, by one or more program modules, applications, or the like executing on a device. It should be appreciated, however, that any of the operations of process flow of FIG. 9 may be performed, at least in part, in a distributed manner by one or more other devices, or more specifically, by one or more program modules, applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Figure 10:
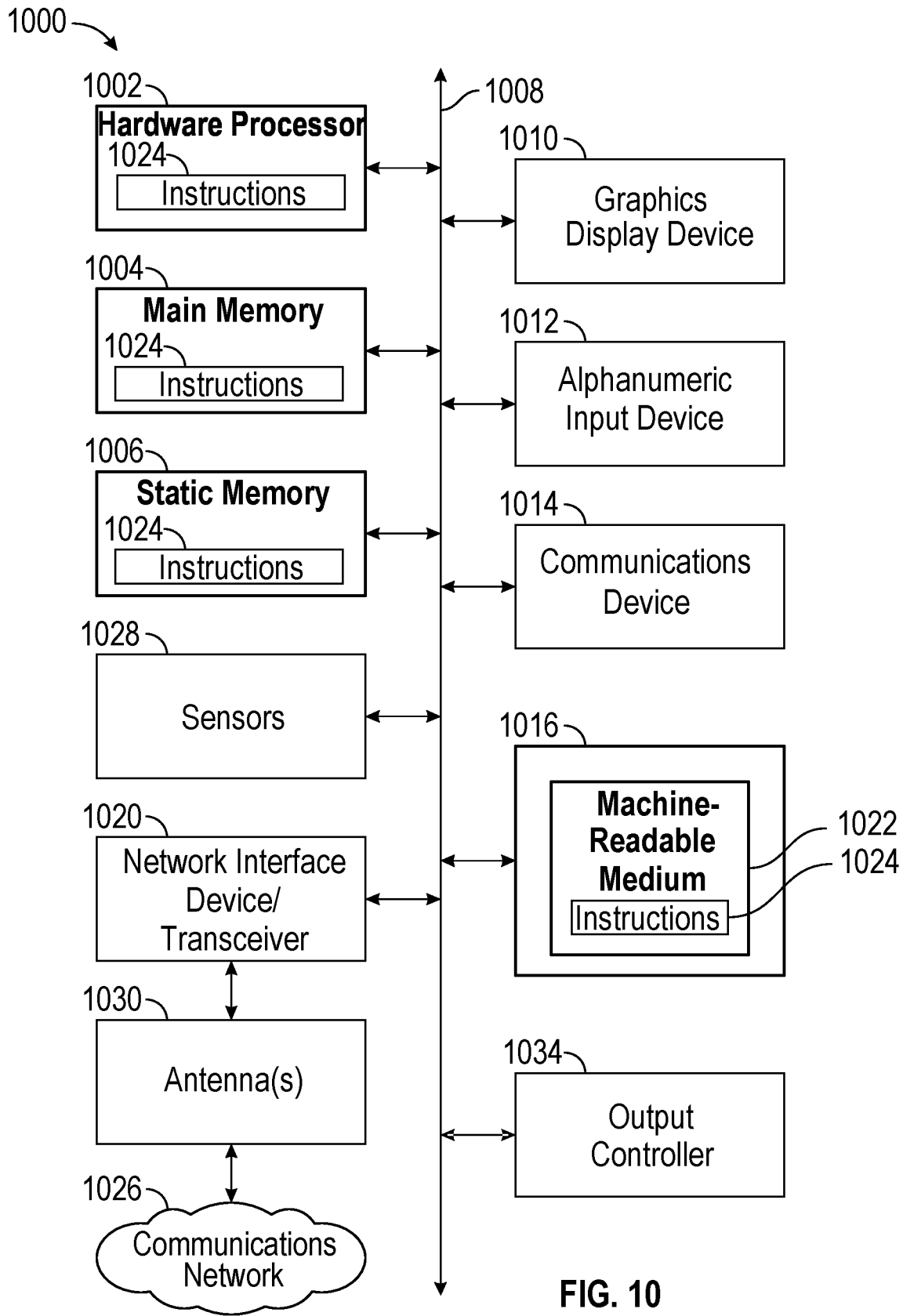
FIG. 10 is a block diagram of an example of a machine or system in accordance with one or more example embodiments of the disclosure.

FIG. 10 is a block diagram of an example of a machine or system 1000 in accordance with one or more example embodiments of the disclosure.

In other embodiments, the machine 1000 may operate as a standalone device or may be connected (e.g., networked) to other machines. In a networked deployment, the machine 1000 may operate in the capacity of a server machine, a client machine, or both in server-client network environments. In an example, the machine 1000 may act as a peer machine in peer-to-peer (P2P) (or other distributed) network environments. The machine 1000 may be a server (e.g., a real-time server), a computer, an automation controller, a network router, a switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer-readable medium containing instructions where the instructions configure the execution units to carry out a specific operation when in operation. The configuration may occur under the direction of the execution units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 1000 may include a hardware processor 1002 (e.g., a central processing unit (CPU), a graphics processing unit (GPU), a hardware processor core, or any combination thereof), a main memory 1004 and a static memory 1006, some or all of which may communicate with each other via an interlink (e.g., bus) 1008. The machine 1000 may further include a graphics display device 1010, an input device 1012 (e.g., a keyboard), and a user interface (UI) navigation device 1014 (e.g., a mouse). In an example, the graphics display device 1010, input device 1012, and UI navigation device 1014 may be a touch screen display. The machine 1000 may additionally include a storage device (i.e., drive unit) 1016, a cyber-physical attack detection device 1018, a network interface device/transceiver 1020 coupled to antenna(s) 1030, and one or more sensors 1028, such as a global positioning system (GPS) sensor, a compass, an accelerometer, or other sensor. The machine 1000 may include an output controller 1034, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 1016 may include a machine readable medium 1022 on which is stored one or more sets of data structures or instructions 1024 (e.g., software) embodying or utilized by any one or more of the techniques or functions described herein. The instructions 1024 may also reside, completely or at least partially, within the main memory 1004, within the static memory 1006, or within the hardware processor 1002 during execution thereof by the machine 1000. In an example, one or any combination of the hardware processor 1002, the main memory 1004, the static memory 1006, or the storage device 1016 may constitute machine-readable media.

The cyber-physical attack detection device 1018 may carry out or perform any of the operations and processes (e.g., the flow diagrams described with respect to FIG. 9) described above.

While the machine-readable medium 1022 is illustrated as a single medium, the term "machine-readable medium" may include a single medium or multiple media (e.g., a centralized or distributed database, and/or associated caches and servers) configured to store the one or more instructions 1024.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 1000 and that cause the machine 1000 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 1024 may further be transmitted or received over a communications network 1026 using a transmission medium via the network interface device/transceiver 1020 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 1020 may include one or more physical jacks (e.g., Ethernet, coaxial, or phone jacks) or one or more antennas to connect to the communications network 1026. In an example, the network interface device/transceiver 1020 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 1000 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "monitoring and computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

It is understood that the above descriptions are for purposes of illustration and are not meant to be limiting.

Although specific embodiments of the disclosure have been described, numerous other modifications and embodiments are within the scope of the disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or operations. Thus, such conditional language is not generally intended to imply that features, elements, and/or operations are in any way required for one or more embodiments.

That which is claimed is:

1. A power system switching element anomaly detection unit comprising:
   a power system switching element position estimator configured to:
      receive a set of measurements and a set of control commands associated with a power system switching element;
      calculate an anomaly confidence score based at least in part on the set of measurements, a classification of a calculated power system switching element position as open or closed, and the set of control commands; and
      generate, using a machine learning classification model trained using features of power switching element positions in at least one of open or closed positions to classify power system switching element positions as open or closed, the classification of the calculated power system switching element position based at least in part on the set of measurements and the set of control commands; and
   a comparison unit configured to:
      receive the calculated power system switching element position from the power system switching element position estimator;
      receive the set of measurements and the set of control commands from the power system switching element position estimator;
      receive a reported power system switching element position associated with the power system switching element; and
      determine a power system switching element anomaly decision based at least in part on a difference between the reported power system switching element position and the classification of the calculated power system switching element position.

2. The power system switching element anomaly detection unit of claim 1, wherein the anomaly confidence score is scaled from 0 to 1.

3. The power system switching element anomaly detection unit of claim 1, wherein a first generated dataset used to train the machine learning classification model is associated with normal operations of the power system switching element, and a second generated dataset used to train the machine learning classification model is associated with abnormal operations of the power system switching element.

4. The power system switching element anomaly detection unit of claim 1, wherein a historical dataset associated with the power system switching element is used to train the machine learning classification model.

5. The power system switching element anomaly detection unit of claim 1, wherein the power system switching element anomaly detection unit is configured to upload data associated with the power system switching element anomaly detection unit to an online server.

6. The power system switching element anomaly detection unit of claim 1, wherein the set of measurements comprises one or more measured values associated with the power system switching element, wherein the one or more measured values comprises a voltage measurement and/or a current measurement for each phase of three phases associated with the power system switching element, a temperature associated with the power system switching element, an arcing current or energy associated with the power system switching element, and/or light sensor data associated with the power system switching element.

7. The power system switching element anomaly detection unit of claim 1, wherein the power system switching element anomaly detection unit is configured to be updated online based on event-based or time-based methods.

8. The power system switching element anomaly detection unit of claim 1, further comprising:
   a status intrusion detection unit configured to:
      determine that a control operation associated with the power system switching element has occurred;
      determine that no maintenance associated with the power system switching element is scheduled; and
      transmit a malicious control sequence alert.

9. The power system switching element anomaly detection unit of claim 8, wherein the power system switching element anomaly detection unit is further configured to receive a status intrusion flag and a flag confidence score from the status intrusion detection unit.

10. A system comprising:
    a power system switching element; and
    a power system switching element anomaly detection unit comprising a power system switching element position estimator configured to:
       receive, via the power system switching element position estimator, a set of measurements and a set of control commands associated with the power system switching element;
       receive a reported power system switching element position associated with the power system switching element;
       calculate, via the power system switching element position estimator, an anomaly confidence score based at least in part on the set of measurements, a classification of a calculated power system switching element position as open or closed, and the set of control commands;
       generate, via the power system switching element position estimator, using a machine learning classification model trained using features of power switching element positions in at least one of open or closed positions to classify power system switching element positions as open or closed, the classification of the calculated power system switching element position based at least in part on the set of measurements and the set of control commands; and
       determine a power system switching element anomaly decision based at least in part on a difference between the reported power system switching element position and the classification of the calculated power system switching element position.

11. The system of claim 10, wherein the anomaly confidence score is scaled from 0 to 1.

12. The system of claim 10, wherein a first generated dataset used to train the machine learning classification model is associated with normal operations of the power system switching element, and a second generated dataset used to train the machine learning classification model is associated with abnormal operations of the power system switching element.

13. The system of claim 10, wherein a historical dataset associated with the power system switching element is used to train the machine learning classification model.

14. The system of claim 10, wherein the power system switching element anomaly detection unit is configured to upload data associated with the power system switching element anomaly detection unit to an online server.

15. The system of claim 10, wherein the set of measurements comprises one or more measured values associated with the power system switching element, wherein the one or more measured values comprises a voltage measurement and/or a current measurement for each phase of three phases associated with the power system switching element, a temperature associated with the power system switching element, an arcing current or energy associated with the power system switching element, and/or light sensor data associated with the power system switching element.

16. A method for detecting an anomaly in a power system switching element, comprising:
   receiving, via a power system switching element position estimator, a set of measurements and a set of control commands associated with the power system switching element;
   receiving a reported power system switching element position associated with the power system switching element;
   calculating, via the power system switching element position estimator, an anomaly confidence score based at least in part on the set of measurements, a classification of a calculated power system switching element position as open or closed, and the set of control commands;
   generating, via the power system switching element position estimator, using a machine learning classification model trained using features of power switching element positions in at least one of open or closed positions to classify power system switching element positions as open or closed, the classification of the calculated power system switching element position based at least in part on the set of measurements and the set of control commands; and
   determining a power system switching element anomaly decision based at least in part on a difference between the reported power system switching element position and the classification of the calculated power system switching element position.

17. The method of claim 16, wherein the anomaly confidence score is scaled from 0 to 1.

18. The method of claim 16, wherein a first generated dataset used to train the machine learning classification model is associated with normal operations of the power system switching element, and a second generated dataset used to train the machine learning classification model is associated with abnormal operations of the power system switching element.

19. The method of claim 16, wherein a historical dataset associated with the power system switching element is used to train the machine learning classification model.

20. The method of claim 16, wherein the power system switching element anomaly detection unit is configured to upload data associated with the power system switching element anomaly detection unit to an online server.

* * * * *